(12) United States Patent
Hirano et al.

(10) Patent No.: US 7,258,941 B2
(45) Date of Patent: Aug. 21, 2007

(54) POLYMER ELECTROLYTE FOR SOLID POLYMER TYPE FUEL CELL AND FUEL CELL

(75) Inventors: Tetsuji Hirano, Yamaguchi (JP); Masayuki Kinouchi, Yamaguchi (JP); Mitsuo Maeda, deceased, late of Kyoto (JP); by Chizuyo Maeda, legal representative, Yawata (JP); by Daisuke Maeda, legal representative, Yokohama (JP); by Megumi Maeda, legal representative, Yawata (JP)

(73) Assignee: UBE Industries, Ltd., Yamaguchi (JP)

( * ) Notice: Subject to any disclaimer, the term of this patent is extended or adjusted under 35 U.S.C. 154(b) by 287 days.

(21) Appl. No.: 10/258,865

(22) PCT Filed: May 7, 2002

(86) PCT No.: PCT/JP02/04429

§ 371 (c)(1),
(2), (4) Date: Oct. 29, 2002

(87) PCT Pub. No.: WO02/091507

PCT Pub. Date: Nov. 14, 2002

(65) Prior Publication Data

US 2004/0101730 A1    May 27, 2004

(30) Foreign Application Priority Data

May 8, 2001 (JP) .............................. 2001-137549

(51) Int. Cl.
*H01M 8/10* (2006.01)
(52) U.S. Cl. .......................... 429/33; 429/30; 429/314; 521/25; 521/27
(58) Field of Classification Search .................. 429/33, 429/30, 314; 521/25, 27
See application file for complete search history.

(56) References Cited

U.S. PATENT DOCUMENTS

| | | | |
|---|---|---|---|
| 4,268,650 A | 5/1981 | Rose | |
| 4,273,903 A | 6/1981 | Rose | |
| 4,360,512 A | 11/1982 | Vidra | |
| 4,360,513 A | 11/1982 | Buck | |
| 4,605,602 A | 8/1986 | Feigenbaum et al. | |
| 5,723,086 A | 3/1998 | Ledjeff et al. | |
| 5,733,678 A | 3/1998 | Ledjeff et al. | |
| 5,985,477 A * | 11/1999 | Iwasaki et al. | 429/33 |
| 6,087,031 A | 7/2000 | Iwasaki et al. | |
| 6,761,989 B2 * | 7/2004 | Terahara et al. | 429/33 |

FOREIGN PATENT DOCUMENTS

| | | |
|---|---|---|
| EP | 1 113 517 | 7/2001 |
| JP | B 46-21458 | 6/1971 |
| JP | A 61-36781 | 2/1986 |
| JP | 63-258930 | 10/1988 |
| JP | A 63-258603 | 10/1988 |
| JP | B2 1-54323 | 11/1989 |
| JP | B2 2-17571 | 4/1990 |
| JP | A 2-294338 | 12/1990 |
| JP | A 8-509571 | 10/1996 |
| JP | 10-21943 | 1/1998 |
| JP | 10-021943 | 1/1998 |
| JP | A 10-45913 | 2/1998 |
| JP | A 11-67224 | 3/1999 |
| JP | A 11-116679 | 4/1999 |
| JP | A 2001-250567 | 9/2001 |
| JP | A 2001-278978 | 10/2001 |
| WO | WO85/00697 | 2/1985 |
| WO | WO98/22989 | 5/1998 |
| WO | WO99/29763 | 6/1999 |
| WO | WO 02/077068 | 10/2002 |

OTHER PUBLICATIONS

R. Nolte et al., "Partially Sulfonated Poly (Arylene Ether Sulfone)-A Versatile Proton Conducting Membrane Material for Modern Energy Conversion Technologies," Journal of Membrane Science, V. 83, 1993, pp. 211-220.
R. Nolte et al., "Modified Polysulfones as Membrane Electrolytes," BHR Group Conf. Ser. Publ, V. 3, 1993, p. 381-385.
Jochen Kerres et al., "Development and Characterization of Crosslinked Ionomer Membranes Based upon Sulfinated and Sulfonated PSU Crosslinked PSU Blend Membranes by Disproportionation of Sulfinic Acid Groups," Journal of Membrane Science, V. 139, 1998, pp. 211-225.
Shiao-Ping "Elizabeth" Yen et al., "Low Cost Membranes for PEM Fuel Cells," Proc. Power Sources Conf., 38th, 1998, pp. 469-472.
M. Walker et al., "Proton-Conducting Polymers with Reduced Methanol Permeation," Journal of Applied Polymer Science, V. 74, 1999, pp. 67-73.
B. Baradie et al., "Water Sorption and Protonic Conductivity in a Filled/Unfilled Thermostable Ionomer for Proton Exchange Membrane Fuel Cell," Macromol. Symp., V. 138, 1999, pp. 85-91.
J. Kerres et al., "Preparation, Characterization and Fuel Cell Application of New Acid-Base Blend Membranes," Journal of New Materials for Electrochemical Systems, V. 3, 2000, pp. 229-239.
Jochen A. Kerres, "Development of Ionomer Membranes for Fuel Cells," Journal of Membrane Science, V. 185, 2001, pp. 3-27.
P. Genova-Dimitrova et al., "Ionomeric Membranes for Proton Exchange Membrane Fuel Cell (PEMFC): Sulfonated Polysulfone Associated with Phosphatoantimonic Acid," Journal of Membrane Science, V. 185, 2001, pp. 59-71.

(Continued)

Primary Examiner—Laura Weiner
(74) Attorney, Agent, or Firm—Young & Thompson

(57) ABSTRACT

A polyelectrolyte for a solid polymeric fuel cell comprising an aromatic polyether sulfone block copolymer comprising a hydrophilic segment containing sulfonic acid groups and a hydrophobic segment having no sulfonic acid group at a hydrophilic segment weight fraction W2 to hydrophobic segment weight fraction W1 ratio falling within a range of $0.6 < W2/W1 < 2.0$. The polyelectrolyte for a solid polymeric fuel cell is inexpensive and durable, and its proton conductivity is less influenced by humidity and temperature.

15 Claims, 4 Drawing Sheets

OTHER PUBLICATIONS

Emily J. Stoler et al., "Stabilization of High Temperature PEM Fuel Cell Membranes," Proceedings of 36th IECE Conference, 2001, pp. 975-980.

Yu Seung Kim et al., "Heteropolyacid/Sulfonated Poly(arylene (ether sulfone) Composites for Proton Exchange Membrandes Fuel Cells," Polymeric Materials: Science & Engineering, V. 85, 2001, pp. 520-521.

Feng Wang et al., "Direct Polymerization of Sulfonated Poly(arylene ether sulfone) Random (Statistical) Copolymers: Candidates for New Proton Exchange Membranes," Journal of Membrane Science, V. 197, 2002, pp. 231-242.

R.N. Johnson et al., "Poly(aryl Ethers) by Nucleophilic Aromatic Substitution. I. Synthesis and Properties," Journal of Polymer Science, V. 5, 1967, pp. 2375-2398.

Zhongwen Wu et al., "Molecular Aggregation of PEEK with PES Blends and the Block Copolymers Composed of PEEK and PES Compounds," Die Angewandte Makromolekulare Chemie, V. 173, 1989, pp. 163-181.

Zhonggang Wang et al., "Synthesis and Properties of Novel Random and Block Copolymers Composed of Phthalimidine- and Perfluoroisopropylidene-Polyarylether-Sulfones," Polymer International, V. 50, 2001, pp. 249-255.

Mitsuru Ueda et al., "Synthesis and Characterization of Aromatic Poly(ether Sulfone)s Containing Pendant Sodium Sulfonate Groups," Journal of Polymer Science: Part A: Polymer Chemistry, V. 31, 1993, pp. 853-858.

Feng Wang et al., "Sodium Sulfonated-Functionalized Poly(Ether Ether Ketone)s," Macromol. Chem. Phys., V. 199, 1998, pp. 1421-1426.

* cited by examiner

Fig.1 Proton conductivity measuring equipment

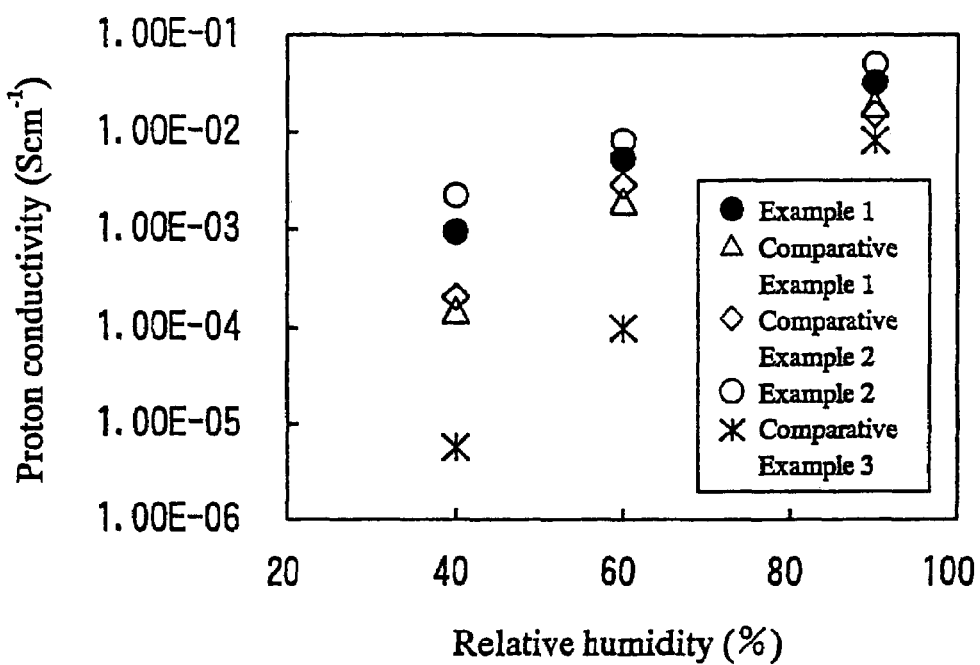
Fig.4  Proton conductivity vs. relative humidity relationship at 50°C
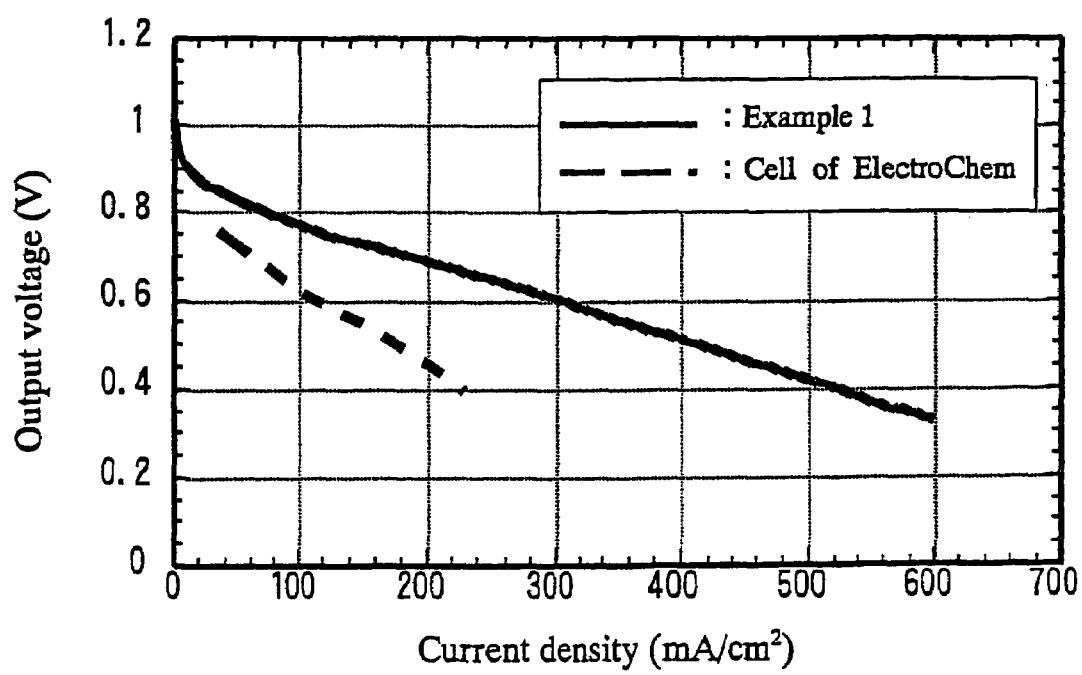
Fig.5  Power generation characteristics (cell temp.:60°C)

POLYMER ELECTROLYTE FOR SOLID POLYMER TYPE FUEL CELL AND FUEL CELL

TECHNICAL FIELD

The present invention relates to a polyelectrolyte suited for use in fuel cells which has reduced dependence of proton conductivity on humidity and temperature, a polyelectrolyte membrane comprising the polyelectrolyte, and a solid polymeric fuel cell comprising the polyelectrolyte and the polyelectrolyte membrane.

BACKGROUND ART

Expectation for fuel cells has recently been raised as a measure coping with environmental issues. In particular, polymeric fuel cells using a proton conductive polyelectrolyte membrane have been promised for their capability of operating in low temperature and possibility of reduction in size and weight.

Very strongly acidic group-containing fluoropolymers exemplified by Nafion (registered trade name of Du Pont, hereinafter the same) are known as polyelectrolytes for polymeric fuel cells. However, the strongly acidic group-containing fluoropolymers, being fluorine-based polymers, are very expensive, and their synthesis and disposal call for consideration for the environment.

To address the expensiveness problem of the very strongly acidic group-containing fluoropolymers, a number of proposals have been made on polyelectrolyte membranes based on less expensive non-fluoropolymers. In particular, aromatic polyether sulfone type polymers are known from the standpoint of cost and durability of polyelectrolyte membranes.

With respect to applications of sulfonated polysulfone, sulfonated aromatic polyether sulfone, and aromatic polyaryl ether sulfone based polyelectrolytes to fuel cells, sulfonated homopolymer membranes, crosslinked membranes, polyblend membranes, inorganic acid blend membranes, and the like are disclosed in Nolte R. et al., *J. Membr. Sci*, vol. 83, 211 (1993), Note R. et al., *BHR Group Conf Ser. Publ.*, vol. 3, 381 (1993), JP-T-8-509571 (corresponding to U.S. Pat. No. 5,733,678 and EP 698300), JP-A-10-21943, JP-A-11-116679, Kerres J. et al., *J. Membr. Sci., vol.* 139, 211 (1998), Yen S-P "E" et al., *Proc. Power Sources Conf* 38th, 469 (1998), Walker M. et al., *J. Appl. Polym. Sci., vol.* 74, 67 (1999), Baradie B. et al., *Macromol. Symp.*, vol. 138, 85 (1999), Kerres J. et al., *J. New Mater. ElectroChem. Systems*, vol. 3, 229 (2000), Kerres J. A., *J. Membr. Sci.*, vol. 185, 3 (2001), Genova-Dimitrova P. et al., *J. Membr. Sci.*, vol. 185, 59 (2001), Stoler E. J. et al., *Proceedings of 36th Intersociety Energy Conversion Engineering Conf,* 975 (2001), Kim. Y. S. et al., *Polymeric Mater: Sci. Eng.*, vol. 85, 520 (2001), and Wang F. et al., *J. Membr. Sci.*, vol. 197, 231 (2002), etc.

JP-A-11-67224, etc. disclose a membrane electrode assembly using a sulfonated aromatic polyether sulfone polyelectrolyte membrane.

In particular, JP-A-11-116679 teaches a polyelectrolyte obtained by sulfonating a precursor polymer having a reduced viscosity of 0.6 to 1.5 dl/g.

JP-A-10-45913 (corresponding to U.S. Pat. No. 6,087, 031) discloses a polyelectrolyte of sulfonated aromatic polyether sulfone having an ion exchange group equivalent weight of 800 to 5000 g/mol.

JP-A-11-67224 discloses an electrolyte of a sulfonated aromatic polyaryl ether sulfone.

JP-A-10-21943 (corresponding to U.S. Pat. No. 5,985,477 and EP 932213) discloses a polyelectrolyte of a sulfonated aromatic polyether sulfone copolymer having an ion exchange group equivalent weight of 500 to 2500 g/mol.

However, concrete description in these publications is confined to random copolymers or blends of homopolymers. There is no mention of an aromatic polyether sulfone block copolymer composed of a hydrophilic segment with a sulfonic acid group and a hydrophobic segment with no sulfonic acid group nor reference to humidity dependence of proton conductivity.

In a solid polymeric fuel cell, fuel (ordinarily hydrogen) is usually humidified to supply moisture to the polyelectrolyte membrane so that the polyelectrolyte membrane is used with an absorbed water content. Therefore, it is desirable for the polyelectrolyte membrane to have unchanged proton conductivity with variation of the humidification degree of the fuel. The heretofore proposed sulfonated polysulfone, sulfonated aromatic polyether sulfone, and sulfonated aromatic polyaryl ether sulfone based polyelectrolyte membranes are disadvantageous in that their ion conductivity varies largely with moisture content (humidity) or temperature of the fuel supplied.

JP-A-2-294338 discloses a maltilayer ion-exchange membrane comprising a sulfonated aromatic polyether sulfone block copolymer but has no mention of the relation between proton conductivity and humidity or temperature variations.

JP-A-2001-278978 (corresponding to U.S. Patent Application 20010021764) discloses a block copolymer comprising sulfonated aromatic polyether sulfone blocks and unsulfonated aromatic polyether sulfone blocks but has no mention of application as an electrolyte membrane for fuel cells, still less humidity or temperature dependence of proton conductivity.

JP-A-2001-250567 (corresponding to U.S. Patent Application 20010041279 and EP 1113517) discloses a block copolymer comprising a block containing sulfonic acid groups and a block containing no sulfonic acid groups for use as a polyelectrolyte membrane of a fuel cell. The publication teaches that the block copolymer has a suppressed water absorption and therefore exhibits excellent water resistance while being equal or superior in ion conductivity to polyelectrolytes having sulfonic acid groups introduced randomly. However, no mention is made of humidity dependence of proton conductivity. It is difficult to anticipate a solution to the above-described problem from the disclosure. Further, JP-A-2001-250567 describes that the block copolymer preferably contains 60% by weight or more of the blocks having no sulfonic acid groups based on the whole copolymer and that a proportion smaller than 60% can result in reduction of water resistance. Comparing among polyelectrolytes of the same structure, however, a higher proportion of blocks having sulfonic acid groups introduced generally leads to higher proton conductivity as is preferred. Polysulfone, polyether ether sulfone, etc. are mentioned as the sulfonic acid group-containing blocks but not as preferred structures. There is no mention of use of aromatic polyaryl ether sulfone as a sulfonic acid group-containing block. Many of the specific examples given are blocks of epoxy resins. These blocks, having an aliphatic main chain, cause a reduction in heat resistance.

DISCLOSURE OF THE INVENTION

An object of the present invention is to provide a polyelectrolyte for sulfonated aromatic polyether sulfone-based solid polymeric fuel cells which is inexpensive, durable, and of which the proton conductivity is less susceptible to the influences of humidity and temperature; a polyelectrolyte membrane for solid polymeric fuel cells which comprises the polyelectrolyte; and a solid polymeric fuel cell which comprises the polyelectrolyte and the polyelectrolyte membrane.

The present inventors have conducted extensive investigations to achieve the above object. They have found as a result that a polyelectrolyte whose proton conductivity is less influenced by humidity and temperature can be obtained by using a sulfonated aromatic polyether sulfone type block copolymer comprising a hydrophilic segment having sulfonic acid groups introduced and a hydrophobic segment having no sulfonic acid group.

The present invention provides a polyelectrolyte for a solid polymeric fuel cell which is characterized by comprising an aromatic polyether sulfone block copolymer comprising a hydrophilic segment containing sulfonic acid groups and a hydrophobic segment having no sulfonic acid group at a hydrophilic segment weight fraction W2 to hydrophobic segment weight fraction W1 ratio falling within a range of $0.6<W2/W1<2.0$.

It is preferred that the hydrophilic segment weight fraction W2 to hydrophobic segment weight fraction W1 ratio of the polyelectrolyte according to the present invention be in the range of $0.7<W2/W1<2.0$.

It is preferred that the sulfonic acid group-containing hydrophilic segment of the polyelectrolyte according to the present invention be water-soluble.

It is preferred that the hydrophobic segment of the polyelectrolyte according to the present invention comprise a structural unit represented by chemical formula (1):

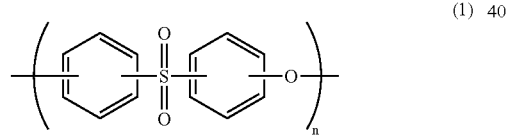

(1)

wherein n represents an integer of 3 to 1500.

It is preferred that the hydrophilic segment of the polyelectrolyte of the present invention be a segment resulting from sulfonation of a structural unit represented by chemical formula (2):

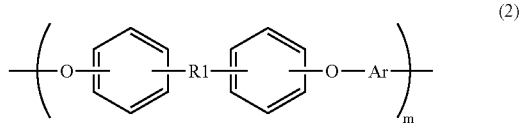

(2)

wherein R1 represents C(=O) or S(=O)$_2$; Ar represents a divalent aromatic residual group; and m represents an integer of 3 to 1500.

The hydrophilic segment of the polyelectrolyte of the present invention is preferably aromatic polyaryl ether sulfone of chemical formula (2) wherein Ar is represented by chemical formula (3):

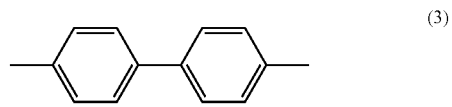

(3)

The polyelectrolyte of the present invention is preferably an aromatic polyether sulfone block copolymer wherein the hydrophobic segment comprises an aromatic polyether sulfone block having a repeating unit represented by chemical formula (4):

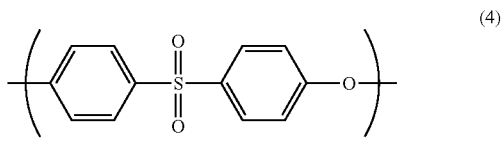

(4)

and the hydrophilic segment comprises a sulfonated aromatic aryl ether sulfone block having a repeating unit represented by chemical formula (5):

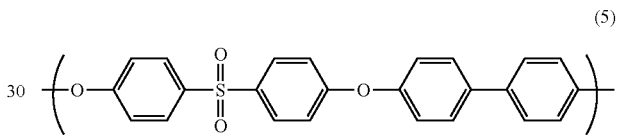

(5)

wherein the moiety represented by chemical formula (6):

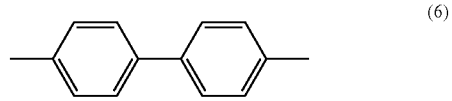

(6)

is sulfonated.

It is preferred for the polyelectrolyte according to the present invention to have an ion exchange capacity of 0.8 to 2.5 mmol/g.

The present invention also provides a polyelectrolyte membrane for a solid polymeric fuel cell which is characterized by comprising the above-described polyelectrolyte according to the present invention.

It is preferred for the polyelectrolyte membrane according to the present invention to have a micro phase separation structure which reveals domains when observed under a transmission electron microscope at 90,000 times magnification.

It is preferred for the polyelectrolyte membrane according to the present invention to have a micro phase separation structure in which the average distance between gravity centers of adjacent domains or the average distance between lamellae is 5 to 900 nm.

It is preferred for the polyelectrolyte membrane of the present invention to have a proton conductivity $C_{90}$ at 90% relative humidity and a proton conductivity $C_{40}$ at 40% relative humidity both at 50° C. satisfying the relationship: $\log(C_{40})/\log(C_{90}) \leq 2.2$.

It is also preferred for the polyelectrolyte membrane of the present invention to have a proton conductivity $C_{t50}$ at 50° C. and a proton conductivity $C_{t90}$ at 90° C. both at 90% relative humidity satisfying the relationship: $\log(C_{t50})/\log(C_{t90}) \leq 1.35$.

The present invention also provides a solid polymeric fuel cell characterized by comprising the above-described polyelectrolyte and/or polyelectrolyte membrane according to the present invention.

BRIEF DESCRIPTION OF THE DRAWINGS

FIG. 4 is a graph showing the proton conductivity vs. relative humidity relationship at 50° C. of the membranes obtained in Examples 1 and 2 and Comparative Examples 1 to 3.

FIG. 5 is a graph showing the cell characteristics of a fuel cell according to the present invention.

BEST MODE FOR CARRYING OUT THE INVENTION

Figure 1:
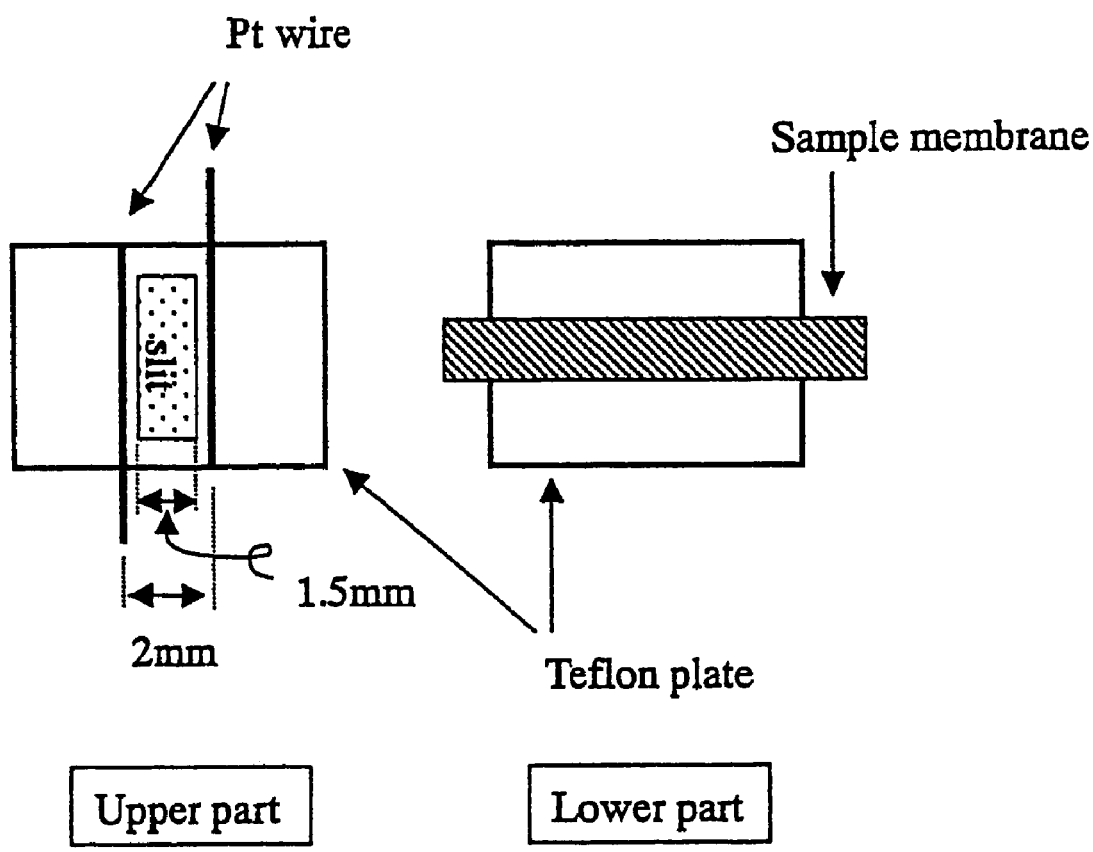
FIG. 1 shows membrane measuring equipment for measuring proton conductivity deduced from complex impedance measurement under prescribed temperature and humidity conditions.

The polyelectrolyte for solid polymeric fuel cells, the polyelectrolyte membrane for solid polymeric fuel cells, and the solid polymeric fuel cell according to the present invention will be described in detail.

The aromatic polyether sulfone block copolymer which constitutes the polyelectrolyte of the present invention is a block copolymer comprising (A) a hydrophilic segment containing sulfonic acid groups and (B) a hydrophobic segment containing no sulfonic acid group.

The sulfonic acid group-containing hydrophilic segment (A) preferably comprises a segment resulting from sulfonation of a structural unit represented by chemical formula (2):

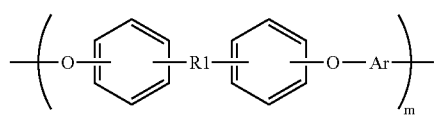
(2)

wherein R1 represents C(=O) or S(=O)$_2$; Ar represents a divalent aromatic residual group; and m represents an integer of 3 to 1500.

In chemical formula (2), R1 is preferably S(=O)$_2$, and m is preferably an integer of 5 to 500. That is, chemical formula (2) is preferably the following formula.

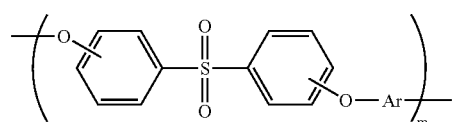

In chemical formula (2), the divalent aromatic residual group represented by Ar includes the following.

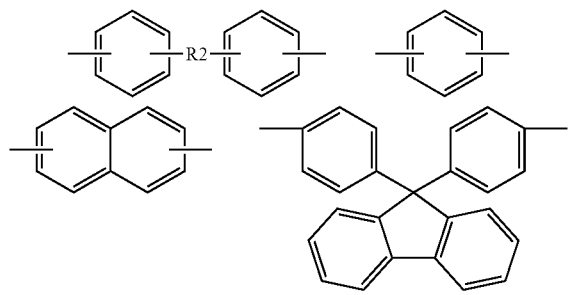

wherein R2 represents a single bond or O.

Preferred of them is the first one in which R2 is a single bond, which is represented by chemical formula (3):

(3)

The sulfonic acid group is preferably introduced into Ar. A particularly preferred structural unit of the sulfonic acid group-containing hydrophilic segment (A) is one represented by chemical formula (7):

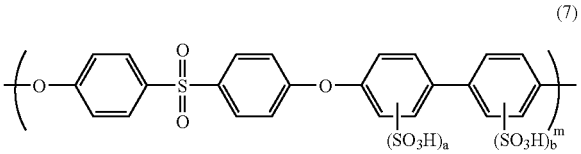
(7)

wherein a and b independently represent 0 or 1 provided that both a and b do not represent 0; and m represents an integer of 3 to 1500.

The hydrophobic segment containing no sulfonic acid group (B) preferably comprises a structure represented by chemical formula (1):

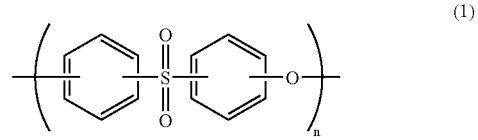
(1)

wherein n represents an integer of 3 to 1500.

The hydrophobic segment (B) is particularly preferably aromatic polyether sulfone having the structure of chemical formula (8):

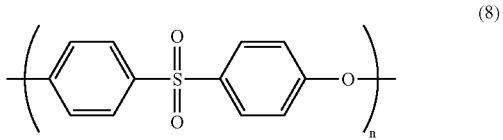
(8)

wherein n represents an integer of 3 to 1500, preferably 5 to 500.

A particularly preferred aromatic polyether sulfone block copolymer constituting the polyelectrolyte of the present invention is a block copolymer in which the sulfonic acid group-containing hydrophilic segment (A) is sulfonated aromatic polyaryl ether sulfone having the structure of chemical formula (7), and the hydrophobic segment containing no sulfonic acid group (B) is aromatic polyether sulfone having the structure of chemical formula (8).

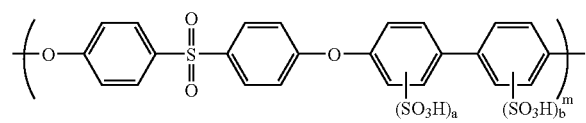

(7)

wherein a and b independently represent 0 or 1 provided that both a and b do not represent 0; and m represents an integer of 3 to 1500.

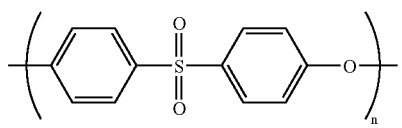

(8)

In the aromatic polyether sulfone block copolymer constituting the polyelectrolyte of the present invention, the ratio of the sulfonic acid group-containing hydrophilic segment (A) to the hydrophobic segment containing no sulfonic acid group (B) is such that the ratio of the weight fraction W2 of the hydrophilic segment to the weight fraction W1 of the hydrophobic segment is in a range of 0.6<W2/W1<2.0, preferably 0.7<W2/W1<2.0, still preferably 0.7<W2/W1<1.8, provided that weight fraction W is defined to be (weight of each segment)/(weight of block copolymer).

If the weight fraction ratio is smaller than the above range, the resulting polyelectrolyte has low proton conductivity. If it exceeds the above range, the block copolymer will be water soluble, which is unfavorable.

The weight ratio of the hydrophobic segment (B) to the whole aromatic polyether sulfone block copolymer [(A)+(B)], being represented by (B)/[(A)+(B)], is preferably in a range of 0.33<(B)/[(A)+(B)]<0.63, particularly 0.36<(B)/[(A)+(B)]<0.59.

Where the weight ratio is smaller than the above range, the block copolymer will be water soluble, which is unfavorable. Where, on the other hand, the weight ratio exceeds the above range, the resulting polyelectrolyte has low proton conductivity, which is unfavorable.

The sulfonic acid groups of the aromatic polyether sulfone block copolymer constituting the polyelectrolyte of the present invention preferably have an ion exchange capacity of 0.8 to 2.5 mmol/g (corresponding to an ion exchange equivalent weight of 400 to 1250 g/mol), particularly 0.9 to 2.3 mmol/g (corresponding to an ion exchange equivalent weight of 435 to 1110 g/mol).

The method of synthesizing the aromatic polyether sulfone block copolymer constituting the polyelectrolyte of the present invention is not particularly limited. It is synthesized by, for example, (1) a method in which an unsulfonated block copolymer is prepared, and only the hydrophilic segment is sulfonated or (2) a method in which a hydrophobic segment prepolymer and a sulfonated hydrophilic segment prepolymer are synthesized beforehand and then allowed to react with each other to form a block copolymer. The positions and the number of sulfonic acid groups introduced are not limited at all.

In the method (1), the unsulfonated block copolymer is obtainable by allowing a hydrophobic segment prepolymer and a unsulfonated hydrophilic segment prepolymer to react with each other.

An aromatic polyether sulfone can be used as the hydrophobic segment prepolymer. It is synthesized by, for example, the reaction between a dialkali metal salt of a dihydric phenol and an aromatic dihalide as taught in R. N. Johnson et al., *J. Polym. Sci., A*-1, vol. 5, 2375 (1967) and JP-B-46-21458.

The aromatic dihalide includes bis(4-chlorophenyl) sulfone, bis(4-fluorophenyl) sulfone, bis(4-bromophenyl) sulfone, bis(4-iodophenyl) sulfone, bis(2-chlorophenyl) sulfone, bis(2-fluorophenyl) sulfone, bis(2-methyl-4-chlorophenyl) sulfone, bis(2-methyl-4-fluorophenyl) sulfone, bis(3,5-dimethyl-4-chlorophenyl) sulfone, and bis(3,5-dimethyl-4-fluorophenyl) sulfone. They may be used either individually or as a combination of two or more thereof. Preferred of them are bis(4-chlorophenyl) sulfone and bis(4-fluorophenyl) sulfone.

The dihydric phenol includes bis(4-hydroxyphenyl) sulfone and bis(4-hydroxyphenyl) ketone, with bis(4-hydroxyphenyl) sulfone being preferred.

The dihydric phenol dialkali metal salt is obtainable by the reaction between the dihydric phenol and an alkali metal compound, such as potassium carbonate, potassium hydroxide, sodium carbonate or sodium hydroxide.

A combination of a sodium or potassium salt of bis(4-hydroxyphenyl) sulfone and bis(4-chlorophenyl) sulfone or bis(4-fluorophenyl) sulfone is a preferred combination of the dihydric phenol dialkali metal salt and the aromatic dihalide.

The reaction between the dihydric phenol dialkali metal salt and the aromatic dihalide is carried out in a polar solvent, such as dimethyl sulfoxide, sulfolane, The reaction between the dihydric phenol dialkali metal salt and the aromatic dihalide is carried out in a polar solvent, such as dimethyl sulfoxide, sulfolane, N-methyl-2-pyrrolidone, 1,3-dimethyl-2-imidazolidinone, N,N-dimethylformamide, N,N-dimethylacetamide, and diphenyl sulfone. The reaction temperature is preferably 140° C. to 320° C. The reaction time is preferably 0.5 hour to 100 hours.

Use of either one of the dihydric phenol and the aromatic dihalide in excess results in formation of end groups that can be utilized for prepolymer molecular weight control and block copolymer synthesis. Otherwise, the dihydric phenol or the aromatic dihalide is used in equimolar amounts, and either one of a monohydric phenol, e.g., phenol, cresol, 4-phenylphenol or 3-phenylphenol, and an aromatic halide, e.g., 4-chlorophenylphenyl sulfone, 1-chloro-4-nitrobenzene, 1-chloro-2-nitrobenzene, 1-chloro-3-nitrobenzene, 4-fluorobenzophenone, 1-fluoro-4-nitrobenzene, 1-fluoro-2-nitrobenzene or 1-fluoro-3-nitrobenzene, is added.

The degree of polymerization of the prepolymer ranges from 3 to 1500, preferably from 5 to 500. With a polymerization degree less than 3, the block copolymer synthesized therefrom hardly manifests the desired characteristics. With a polymerization degree exceeding 1500, it is difficult to synthesize the block copolymer.

Because an aromatic ring bonded to an electron attractive group is resistant to sulfonation, it is preferred for the hydrophobic segment prepolymer to have an electron attractive group, such as C(=O) or S(=O)$_2$, bonded to the aromatic ring thereof. A preferred hydrophobic segment prepolymer has a structure shown by chemical formula (1):

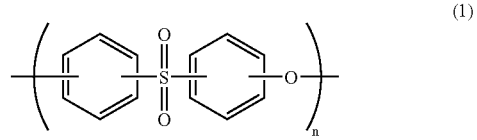
(1)

wherein n represents an integer of 3 to 1500.

The unsulfonated hydrophilic segment prepolymer used in the method (1) is preferably synthesized from an aromatic dihalide and a dihydric phenol having no electron attractive group on its aromatic ring. The dihydric phenol having no electron attractive group on its aromatic ring includes hydroquinone, resorcinol, 1,5-dihydroxynaphthalene, 1,6-dihydroxynaphthalene, 1,7-dihydroxynaphthalene, 2,7-dihydroxynaphthalene, 4,4'-biphenol, 2,2'-biphenol, bis(4-hydroxyphenyl) ether, bis(2-hydroxyphenyl) ether, 2,2-bis(4-hydroxyphenyl)propane, 2,2-bis(3-methyl-4-hydroxyphenyl)propane, 2,2-bis(3,5-dimethyl-4-hydroxyphenyl)propane, bis(4-hydroxyphenyl)methane, 2,2-bis(3,5-dimethyl-4-hydroxyphenyl)hexafluoropropane, and 9,9-bis(4-hydroxyphenyl)fluorene. Preferred of them are hydroquinone, resorcinol, 1,5-dihydroxynaphthalene, 1,6-dihydroxynaphthalene, 1,7-dihydroxynaphthalene, 2,7-dihydroxynaphthalene, 4,4'-biphenol, 2,2'-biphenol, bis(4-hydroxyphenyl) ether, bis(2-hydroxyphenyl) ether, and 9,9-bis(4-hydroxyphenyl)fluorene.

The aromatic dihalide includes those with a sulfone group which are useful for the synthesis of the hydrophobic segment prepolymer and, in addition, those with a ketone group, such as 4,4'-difluorobenzophenone and 2,4'-difluorobenzophenone. The most desirable unsulfonated hydrophilic segment prepolymer is one having the structure of chemical formula (2):

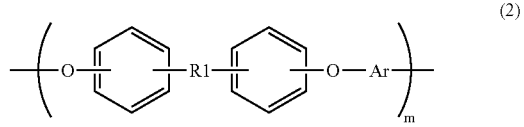
(2)

wherein R1 represents C(=O) or S(=O)$_2$; Ar represents a divalent aromatic residual group; and m represents an integer of 3 to 1500.

In chemical formula (2), the divalent aromatic residual group represented by Ar is selected from the group shown below, wherein R2 represents a single bond or O.

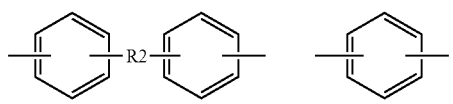

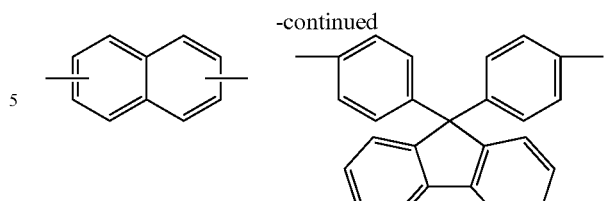

Commercially available polymers whose structures are equivalent to those described above may be made use of as the hydrophobic segment prepolymer or the unsulfonated hydrophilic segment prepolymer after, if necessary, molecular weight and end group modification. Useful commercially available polymers include Sumikaexcel® from Sumitomo Chemical Co., Ltd., which is aromatic polyether sulfone having the structure of formula (9), and Radel R® from Solvay, which is aromatic polyaryl ether sulfone having the structure of formula (10):

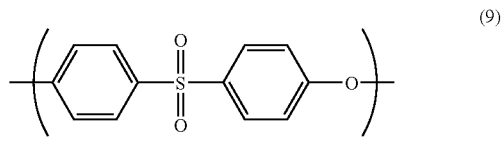
(9)

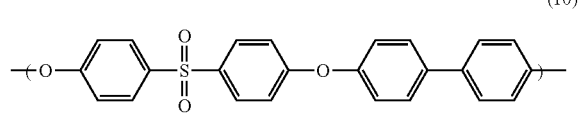
(10)

Molecular weight and end group modification of commercially available polymers can be effected by ether exchange with the aforementioned dihydric phenol alkali metal salt or monohydric phenol under the same conditions as for the aromatic polyether sulfone synthesis described in R. N. Johnson et al., *J. Polym Sci., A*-1, vol. 5, 2375 (1967) or JP-B-46-21458.

The unsulfonated block copolymer is synthesized by the reaction between the above-described hydrophobic segment prepolymer and unsulfonated hydrophilic segment prepolymer. It is preferred for the hydrophobic segment prepolymer to have a halogen end group or a phenol alkyl metal salt end group. It is preferred for the unsulfonated hydrophilic segment prepolymer to have a corresponding halogen end group or a corresponding phenol alkali metal salt end group. The reaction is carried out in the aforementioned solvent at a reaction temperature of 140° C. to 320° C. for a reaction time of 0.5 hour to 100 hours. This reaction is described, e.g., in Z. Wu et al., *Angew. Makromol. Chem.*, vol. 173, 163 (1989) and Z. Wang et al., *Polym Int.*, vol. 50, 249 (2001).

The unsulfonated block copolymer can also be synthesized by the reaction between the two segment prepolymers both having a phenol alkali metal salt end group by using a linking agent in the same manner. The above-recited aromatic dihalides can be used as the linking agent. Aromatic difluorides, such as bis(2-fluorophenyl) sulfone and bis(4-fluorophenyl) sulfone, are preferred as the linking agent for their high reactivity.

Sulfonation of the resulting unsulfonated block copolymer can be achieved with a sulfonating agent, such as 90 to 98% sulfuric acid, under such conditions as stirring at room temperature for 1 to 100 hours.

Since the hydrophobic segment having an electron attractive group bonded to the aromatic ring is resistant to sulfonation, only the hydrophilic segment is successfully sulfonated.

The above-mentioned method is described, e.g., in JP-A-61-36781, JP-B-1-54323, and JP-B-2-17571.

In addition to the method (1), the aromatic polyether sulfone block copolymer constituting the polyelectrolyte of the present invention can be prepared by the method (2) in which a hydrophobic segment prepolymer and a sulfonated hydrophilic segment prepolymer are previously synthesized and allowed to react with each other to form a block copolymer.

In this case, the sulfonated hydrophilic segment prepolymer is obtained by sulfonating the aforementioned unsulfonated hydrophilic segment prepolymer.

Sulfonation of the hydrophilic segment prepolymer may occur on not only aromatic rings having no electron attractive group bonded thereto but those having an electron attractive group bonded.

It is possible to use sulfonated hydrophilic segment prepolymer synthesized by using a previously sulfonated aromatic dihalide, such as sodium 5,5'-sulfonylbis(2-chlorobenzenesulfonate) disclosed, e.g., in M. Ueda et al., *J. Polym. Sci.:Part A: Polym. Chem.*, vol. 31, 853 (1993) and sodium 5,5'-carbonylbis(2-fluorobenzenesulfonate) disclosed in F. Wang et al., *Macromol. Chem. Phys.*, vol. 199, 1421 (1998), in accordance with the manner taught, e.g., in JP-A-2001-278978. In this case, the hydrophobic segment prepolymer can be selected from those having an aromatic ring with no electron attractive group bonded as well as the above-recited hydrophobic segment prepolymers. For instance, the above-described unsulfonated hydrophilic segment prepolymers can also be used.

The polyelectrolyte membrane according to the present invention is obtained by film formation techniques using the polyelectrolyte of the present invention comprising the above-described aromatic polyether sulfone block copolymer.

The polyelectrolyte membrane of the present invention has a micro phase separation structure which reveals domains when observed under a transmission electron microscope at 90,000 times magnification.

The micro phase separation structure observed is preferably such that the average distance between gravity centers of adjacent domains or the average distance between lamellae is 5 to 900 nm, particularly 10 to 800 nm.

The film formation method for obtaining the polyelectrolyte membrane for a solid polymeric fuel cell of the present invention from the aromatic polyether sulfone block copolymer thus prepared is not particularly restricted. For example, the aromatic polyether sulfone block copolymer is dissolved in a polar solvent, such as dimethyl sulfoxide, sulfolane, N-methyl-2-pyrrolidone, 1,3-dimethyl-2-imidazolidinone, N,N-dimethylformamide, N,N-dimethylacetamide or diphenyl sulfone, casting the solution on a carrier, and removing the polar solvent by evaporation. The film thickness is 5 to 200 µm, preferably 10 to 150 µm. A film thinner than 5 µm is difficult to handle. A film thicker than 200 µm is unfavorable because a fuel cell comprising such a membrane has reduced power generation efficiency.

If desired, the polyelectrolyte membrane of the present invention may have part of its sulfonic acid groups converted to a metal salt form as long as the characteristics of the present invention are not impaired. Further, the membrane can be reinforced by fibers, a porous film, and the like. If necessary, the polyelectrolyte membrane may have blended therein inorganic acids, e.g., phosphoric acid, hypophosphorous acid, and sulfuric acid, or salts thereof, perfluoroalkylsulfonic acids having 1 to 14 carbon atoms or salts thereof, perfluoroalkylcarboxylic acids having 1 to 14 carbon atoms or salts thereof, inorganic substances, e.g., platinum, silica gel, silica, and zeolite, and other polymers.

The polyelectrolyte membrane according to the present invention is characterized by its small dependence of proton conductivity on humidity. That is, a proton conductivity $C_{90}$ at 90% relative humidity and a proton conductivity $C_{40}$ at 40% relative humidity both at 50° C. preferably satisfies the relationship: $\log(C_{40})/\log(C_{90}) \leq 2.2$.

Since the polyelectrolyte membrane has small dependence of proton conductivity on humidity and hardly reduces in proton conductivity at low humidity, reduction in quantity of power generation hardly occur even under the shortage of moisture supply at, for example, the start of operation of a fuel cell. When applied to automobile fuel cells, this leads to effects such as a short rise time.

This also produces the effect that moisture or humidity control is easy.

The polyelectrolyte membrane of the present invention is characterized by small dependence of proton conductivity on temperature, preferably having a proton conductivity $C_{t50}$ at 50° C. and a proton conductivity $C_{t90}$ at 90° C. both at 90% relative humidity satisfying the relationship: $\log(C_{t50})/\log(C_{t90}) \leq 1.35$.

The hydrophilic segment phase constituting the micro phase separation structure embraces much water even at low humidity. It is assumed that the water content secures effective paths for proton movement to suppress reduction in proton conductivity at low humidity, which would account for the reduced humidity dependence of proton conductivity of the polyelectrolyte membrane according to the present invention. To the contrary, sulfonated homopolymers and random copolymers evenly reduce the whole water absorption with a drop of humidity, and blends of sulfonated polymers and unsulfonated polymers exhibit macro phase separation, failing to sufficiently assure paths for proton movement. Compared with the block copolymer, it seems to follow that protons encounter increased resistance at low humidity, which can result in a great reduction of proton conductivity.

The method of fabricating the fuel cell comprising the polyelectrolyte and/or polyelectrolyte membrane according to the present invention is not particularly limited, and known techniques can be used. For example, a membrane electrode assembly can be prepared by forming a gas diffusion electrode directly on the polyelectrolyte membrane, wherein the gas diffusion electrode has a catalyst, such as platinum, a platinum-ruthenium alloy or a platinum-tin alloy, or a carrier, such as carbon, having dispersively supported thereon fine particles of the catalyst; or bonding the polyelectrolyte membrane and the gas diffusion electrode by hot pressing or with an adhesive liquid.

The present invention will now be illustrated in greater detail with reference to Examples and Comparative Examples. Measured values shown in Examples and Comparative Examples were obtained by the following methods.

1) Measurement of ηsp/c (Reduced Viscosity) of Aromatic Polyether Sulfone

Measurement was made on a sample solution in an N-methyl-2-pyrrolidone solvent at a concentration of 0.5 g/dl with a Ubbellohde viscometer at a temperature of 25° C. Equation (1) was used to calculate.

$$\eta_{sp/c} = \frac{t_s - t_0}{t_0} \frac{1}{c} \quad (1)$$

where $t_s$ is a measuring time for the solution; $t_0$ is a measuring time for the solvent; and c is the solution concentration.

2) Measurement of Proton Conductivity

A membrane was clamped in a fixture shown in FIG. 1 in a thermo-hygrostat. The complex impedance of the membrane was measured with 3532 LCR HiTester, supplied by Hioki E. E. Corp., under prescribed temperature and humidity conditions to obtain proton conductivity.

The proton conductivity vs. humidity relationship was represented in terms of $\log(C_{40})/\log(C_{90})$ calculated from proton conductivity $C_{40}$ at 40% relative humidity and proton conductivity $C_{90}$ at 90% relative humidity both at 50° C. The proton conductivity vs. temperature relationship was represented in terms of $\log(C_{t50})/\log(C_{t90})$ calculated from proton conductivity $C_{t50}$ at 50° C. and proton conductivity $C_{t90}$ at 90° C. both at 90% relative humidity.

3) Measurement of Ion Exchange Capacity

A sample was stirred in an aqueous solution having a known sodium hydroxide content at room temperature for 16 hours, followed by filtration. The filtrate was titrated with a 0.01N hydrochloric acid aqueous solution to obtain the amount of consumed sodium hydroxide, from which the ion exchange capacity was calculated.

4) Transmission Electron Microscopic Observation

A slice cut out of a membrane along the thickness direction was observed under JEM-200CX, supplied by JEOL Ltd., at a magnification of 90,000 times.

EXAMPLE 1

Polymerization for Polymer a (Hydrophobic Segment Prepolymer):

Into a four-necked flask equipped with a stirrer, a Dean-Stark trap, a thermometer, and a nitrogen inlet were charged 51.7 g of bis(4-fluorophenyl) sulfone, 50 g of bis(4-hydroxyphenyl) sulfone, and 36 g of potassium carbonate, and 300 ml of N,N-dimethylacetamide and 200 ml of toluene were added thereto. The mixture was stirred while heating in a nitrogen stream. The temperature was raised up to 165° C. while removing produced water together with toluene, and the stirring was continued at that temperature for 3 hours. The solution was poured into a large quantity of water to precipitate a white solid, which was collected by filtration. The resulting solid was washed twice in hot water and once in methanol to obtain polymer a. The resulting polymer had a reduced viscosity $\eta_{sp/c}$ of 0.42.

Polymerization for Block Polymer BP-1 (Aromatic Polyether Sulfone Block Copolymer):

Bis(4-fluorophenyl) sulfone (25.3 g), 18.9 g of 4,4'-biphenol, and 18 g of potassium carbonate were put in, and 150 ml of N,N-dimethylacetamide and 100 ml of toluene were added thereto, followed by stirring with heating in a nitrogen stream. The temperature was raised up to 165° C. while removing produced water together with toluene, and the stirring was continued for 3 hours at that temperature to prepare a polymer b solution. Separately, 42.6 g of polymer a was added to a mixture of 150 ml of N,N-dimethylacetamide and 100 ml of toluene, and the mixture was heated up to 165° C. in a nitrogen stream while removing produced water together with toluene to prepare a polymer a solution. The polymer a solution was added to the polymer b solution, and the mixed solution was stirred at 160° C. for 1 hour. The solution was poured into a large quantity of water to precipitate a white solid, which was collected by filtration. The resulting solid was washed twice in hot water and then once in methanol to give block polymer BP-1. The resulting polymer had a reduced viscosity $\eta_{sp/c}$ of 0.63.

Sulfonation of Block Polymer BP-1:

In 100 ml of 98% sulfuric acid was dissolved 10 g of block polymer BP-1, and the solution was stirred at room temperature for 24 hours. The solution was poured into a large amount of water to precipitate a white solid, which was separated by filtration and washed twice in hot water and then once in methanol to give polymer BPS-1.

The resulting polymer had an ion exchange capacity of 1.78 mmol/g (562 g/mol). H-NMR analysis revealed that the hydrophilic segment weight fraction W2 to hydrophobic segment weight fraction W1 ratio, W2/W1, was 0.98. The proportion of the hydrophobic segment in the whole block copolymer was 0.51.

Figure 2:
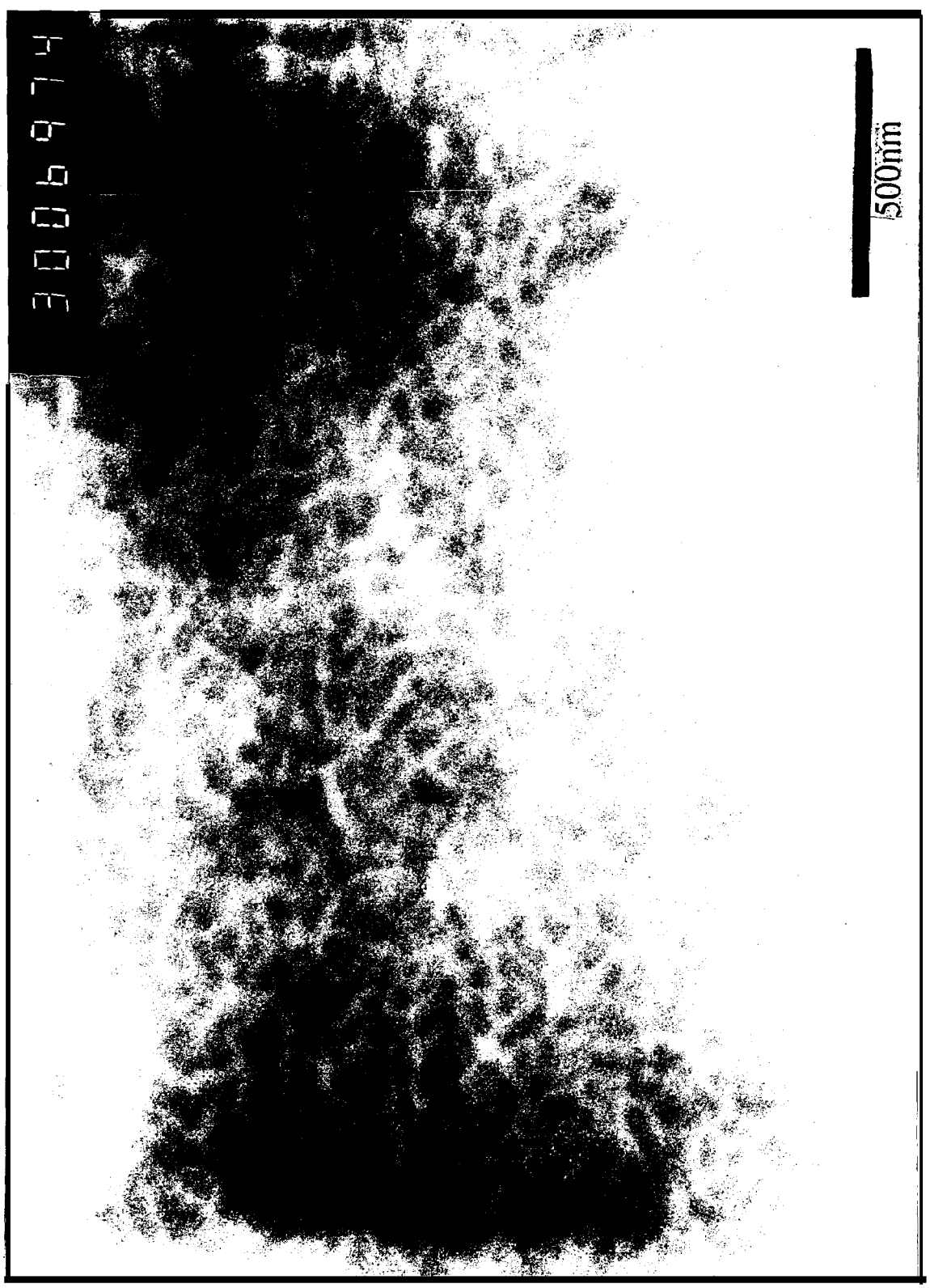
FIG. 2 is a TEM photomicrograph (at 90,000 times magnification) of the membrane obtained in Example 1.
Figure 3:
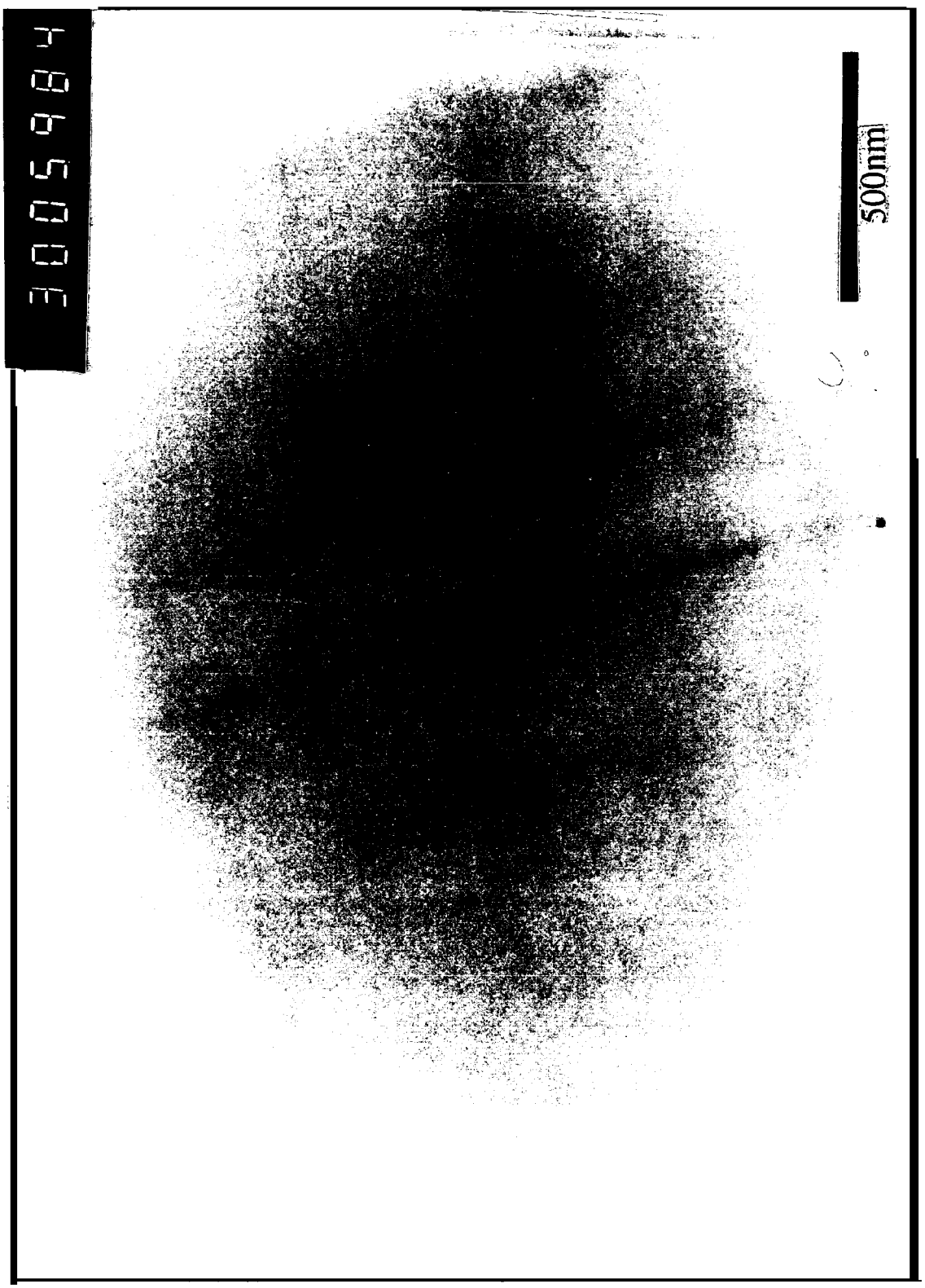
FIG. 3 is a TEM photomicrograph (at 90,000 times magnification) of the membrane obtained in Comparative Example 1.

TEM observation of a membrane obtained by the method described hereunder revealed a phase separation structure, which furnished the confirmation that the polymer was a block copolymer. Further, the average distance between gravity centers of adjacent domains which were observed as black regions in a TEM micrograph was 87 nm (see FIG. 2).

Polymer BPS-1 was dissolved in N,N-dimethylacetamide in a concentration of 20 wt %, and the solution was cast on a glass plate and dried at 60° C. for 2 hours and then at 140° C. for 5 hours under reduced pressure to form a 50 µm thick BPS-1 membrane. After the BPS-1 membrane was washed with water twice, the proton conductivity of the membrane was measured at 50° C. at a varied relative humidity. The results are shown in Table 1. Graphical representation of the results is shown in FIG. 4. It is seen that the block copolymer of Example 1 exhibits relatively high proton conductivity in a low humidity condition as compared with the random copolymer of Comparative Example 1 and the polymer blend of Comparative Example 2.

The proton conductivity of the BPS-1 membrane measured at a relative humidity of 90% and at a varied measuring temperature is shown in Table 2.

The BPS-1 membrane was boiled in hot water at 100° C. for 5 hours. Immediately after being taken out of water, the membrane having absorbed water retained sufficient strength. The weight of the membrane having been boiled followed by drying was virtually equal to that of the membrane before boiling, revealing no change in weight due to boiling.

COMPARATIVE EXAMPLE 1

Polymerization for Random Copolymer RP-1:

Bis(4-fluorophenyl) sulfone (51.4 g), 25 g of bis(4-hydroxyphenyl) sulfone, 18.9 g of 4,4'-biphenol, and 36 g of potassium carbonate were put in, and 300 ml of N,N-dimethylacetamide and 200 ml of toluene were added thereto. The mixture was heated up to 165° C. with stirring in a nitrogen stream while removing produced water together with toluene, and the stirring was continued for 3 hours at that temperature. The solution was poured into a large amount of water to precipitate a white solid, which was collected by filtration. The solid thus obtained was washed twice in hot water and once in methanol and dried under reduced pressure to give random copolymer RP-1. The resulting polymer had a reduced viscosity $\eta_{sp/c}$ of 0.55.

Sulfonation of Random Copolymer RP-1:

In 100 ml of 98% sulfuric acid was dissolved 10 g of random copolymer RP-1, and the solution was stirred at room temperature for 24 hours. The solution was poured into a large amount of water to precipitate a white solid, which was separated by filtration and washed twice in hot water and then once in methanol to give polymer RPS-1. The resulting polymer had an ion exchange capacity of 1.73 mmol/g. As a result of H-NMR analysis, the sulfonated unit structure obtained from 4,4'-biphenol and bis(4-fluorophenyl) sulfone was found to have a weight fraction of 0.95. The polymer was confirmed to be a random copolymer from the fact that a membrane obtained therefrom by the method described hereunder revealed no phase separation structure under TEM observation.

Polymer RPS-1 was molded into film in the same manner as in Example 1 to obtain a 50 μm thick RPS-1 membrane. The proton conductivity of the resulting membrane measured at 50° C. at a varied humidity is shown in Table 1, and that measured at 90% relative humidity at a varied temperature is shown in Table 2.

REFERENCE EXAMPLE 1

Polymerization for Homopolymer B:

Polymer b was synthesized in the same manner as in Example 1, except for using the aromatic dihalide and the dihydric phenol in equimolar amounts. The solution was poured into a large quantity of water to precipitate a white solid, which was collected by filtration, washed twice in hot water and once in methanol, and dried under reduced pressure to obtain homopolymer B of polymer b. The resulting homopolymer B had a reduced viscosity of $\eta_{sp/c}$ of 0.58.

Sulfonation of Homopolymer B:

Ten grams of homopolymer B was dissolved in 100 ml of 98% sulfuric acid, followed by stirring at room temperature for 24 hours. The solution was poured into a large amount of 1N hydrochloric acid to precipitate a white solid. The solid was collected by filtration, washed twice in 0.5N hydrochloric acid, and dried at 80° C. under reduced pressure to give sulfonated homopolymer B, which was water-soluble. The resulting polymer had an ion exchange capacity of 3.5 mmol/g.

COMPARATIVE EXAMPLE 2

Polymerization for Homopolymer A and Film Formation of Homopolymers A/B Blend:

Homopolymer A of polymer a was synthesized in the same manner as in Example 1, except for using the aromatic dihalide and the dihydric phenol in equimolar amounts. The resulting homopolymer A had a reduced viscosity $\eta_{sp/c}$ of 0.61.

Five grams of homopolymer A and 5 g of the sulfonated homopolymer B synthesized in Reference Example 1 were dissolved in N,N-dimethylacetamide at room temperature in a concentration of 20 wt %. The polymer solution was molded into film to obtain a 50 μm thick membrane made of a blend of homopolymer A and sulfonated homopolymer B. The weight fraction of homopolymer A and sulfonic acid group-containing homopolymer B was 1.0. The ion exchange capacity was 1.75 mmol/g. The proton conductivity measured at 50° C. at a varied relative humidity is shown in Table 1.

EXAMPLE 2

Polymerization for Block Polymer BP-2 (Aromatic Polyether Sulfone Block Copolymer):

Bis(4-chlorophenyl) sulfone (18.2 g), 12 g of 4,4'-biphenol, and 11.6 g of potassium carbonate were put in, and 150 ml of N,N-dimethylacetamide and 100 ml of toluene were added thereto. The mixture was heated while stirring in a nitrogen stream. The temperature was raised up to 165° C. while removing produced water together with toluene, and the stirring was continued for 3 hours at that temperature to prepare a solution of polymer c. Separately, 45.5 g of polymer a synthesized in Example 1 was added to a mixture of 150 ml of N,N-dimethylacetamide and 100 ml of toluene, and the solution was heated up to 165° C. in a nitrogen stream while removing produced water together with toluene to prepare a solution of polymer a. The polymer a solution was added to the polymer c solution, and the mixture was stirred at 170° C. for 2 hours. The solution was poured into a large amount of water to precipitate a white solid, which was collected by filtration. The resulting solid was washed twice in hot water and once in methanol to obtain block polymer BP-2. The resulting polymer had a reduced viscosity $\eta_{sp/c}$ of 0.53.

Sulfonation of Block Polymer BP-2:

Ten grams of block polymer BP-2 was dissolved in 100 ml of 98% sulfuric acid, and the solution was stirred at room temperature for 24 hours. The solution was poured into a large amount of water to precipitate a white solid, which was collected by filtration and washed twice in hot water and once in methanol to give polymer BPS-2.

The resulting polymer had an ion exchange capacity of 1.51 mmol/g (662 g/mol). H-NMR analysis revealed that the hydrophilic segment weight fraction W2 to hydrophobic segment weight fraction W1 ratio, W2/W1, was 0.75. The proportion of the hydrophobic segment in the whole block copolymer was 0.57.

TEM observation of a membrane obtained therefrom revealed a phase separation structure, which furnished the confirmation that the polymer was a block copolymer.

Polymer BPS-2 was dissolved in N,N-dimethylacetamide in a concentration of 20 wt %, and the solution was cast on a glass plate and dried at 60° C. for 2 hours and then at 140° C. for 5 hours under reduced pressure to form a 50 μm thick BPS-2 membrane. The membrane was immersed in a 1N NaOH aqueous solution for 2 hours and washed twice with ion-exchanged water. The membrane was further immersed in 1N HCl for 2 hours at room temperature and washed three times with ion-exchanged water. After confirming that the washing was neutral, the membrane was dried. The thus treated membrane had an ion exchange capacity of 1.53 mmol/g.

TEM observation of the treated membrane also revealed a phase separation structure.

The proton conductivity of the membrane measured at 50° C. at a varied relative humidity is shown in Table 1. Graphical representation of the results is shown in FIG. 4.

As is apparent from Tables 1 and 2 and FIG. 4, the block copolymers of Examples 1 and 2 exhibit high proton conductivity under any humidity and temperature condition and suppress reduction of proton conductivity with a reduction of humidity (showing a milder slope of the plots in FIG. 4)

as compared with the random copolymer of Comparative Example 1 and the polymer blend of Comparative Example 2.

COMPARATIVE EXAMPLE 3

Polymerization for Block Polymer BP-3 (Aromatic Polyether Sulfone Block Copolymer):

Bis(4-chlorophenyl) sulfone (18.2 g), 12 g of 4,4'-biphenol, and 11.6 g of potassium carbonate were put in, and 150 ml of N,N-dimethylacetamide and 100 ml of toluene were added thereto. The mixture was heated while stirring in a nitrogen stream. The temperature was raised up to 165° C. while removing produced water together with toluene, and the stirring was continued for 3 hours at that temperature to prepare a solution of polymer e. Separately, 63.2 g of polymer a synthesized in Example 1 was added to a mixture of 150 ml of N,N-dimethylacetamide and 100 ml of toluene, and the solution was heated up to 165° C. in a nitrogen stream while removing produced water together with toluene to prepare a polymer a solution. The polymer a solution was added to the polymer e solution, and the mixture was stirred at 170° C. for 2 hours. The solution was poured into a large amount of water to precipitate a white solid, which was collected by filtration. The resulting solid was washed twice in hot water and once in methanol to obtain block polymer BP-3. The resulting polymer had a reduced viscosity $\eta_{sp/c}$ of 0.55.

Sulfonation of Block Polymer BP-3:

Ten grams of block polymer BP-3 was dissolved in 100 ml of 98% sulfuric acid, and the solution was stirred at room temperature for 24 hours. The solution was poured into a large amount of water to precipitate a white solid, which was collected by filtration and washed twice in hot water and once in methanol to give polymer BPS-3.

The resulting polymer had an ion exchange capacity of 1.21 mmol/g (781 g/mol). H-NMR analysis revealed that the hydrophilic segment weight fraction W2 to hydrophobic segment weight fraction W1 ratio, W2/W1, was 0.52. The proportion of the hydrophobic segment in the whole block copolymer was 0.66.

TEM observation of a membrane obtained therefrom revealed a phase separation structure, which furnished the confirmation that the polymer was a block copolymer.

Polymer BPS-3 was dissolved in N,N-dimethylacetamide in a concentration of 20 wt %, and the solution was cast on a glass plate and dried at 60° C. for 2 hours and then at 140° C. for 5 hours under reduced pressure to form a 50 μm thick BPS-3 membrane. The membrane was immersed in a 1N NaOH aqueous solution for 2 hours and washed twice with ion-exchanged water. The membrane was further immersed in 1N HCl for 2 hours at room temperature and washed three times with ion-exchanged water. After confirming that the washing was neutral, the membrane was dried. The thus treated membrane had an ion exchange capacity of 1.22 mmol/g.

The proton conductivity of the BPS-3 membrane measured at 50° C. at a varied relative humidity is shown in Table 1. Graphical representation of the results is shown in FIG. 4. It is seen that the membrane was inferior to Example 1 and Example 2 in both proton conductivity at various humidities and humidity dependence of proton conductivity.

EXAMPLE 3

Polymerization for Block Polymer BP-4 (Aromatic Polyether Sulfone Block Copolymer):

Bis(4-chlorophenyl) sulfone (30.3 g), 10 g of 4,4'-biphenol, 5.91 g of hydroquinone, and 19.5 g of potassium carbonate were put in, and 150 ml of dimethyl sulfoxide and 100 ml of toluene were added thereto. The mixture was heated while stirring in a nitrogen stream. The temperature was raised up to 185° C. while removing produced water together with toluene, and the stirring was continued for 2 hours at that temperature to prepare a solution of polymer f. Separately, 52 g of polymer a synthesized in Example 1 was dissolved in 150 ml of dimethyl sulfoxide to prepare a polymer a solution. The polymer a solution was added to the polymer f solution, and the mixed solution was stirred at 173° C. for 2 hours. The solution was poured into a large amount of water to precipitate a white solid, which was collected by filtration. The resulting solid was washed twice in hot water and once in methanol to give block polymer BP-4. The resulting polymer had a reduced viscosity $\eta_{sp/c}$ of 0.66.

Sulfonation of Block Polymer BP-4:

Ten grams of block polymer BP-4 was dissolved in 100 ml of 98% sulfuric acid, and the solution was stirred at 40° C. for 16 hours. The solution was poured into a large amount of water to precipitate a white solid, which was collected by filtration and washed twice in hot water and once in methanol to give polymer BPS-4.

The resulting polymer had an ion exchange capacity of 1.43 mmol/g (714 g/mol). H-NMR analysis revealed that the hydrophilic segment weight fraction W2 to hydrophobic segment weight fraction W1 ratio, W2/W1, was 0.95. The proportion of the hydrophobic segment in the whole block copolymer was 0.51.

TEM observation of a membrane obtained therefrom revealed a phase separation structure, which furnished the confirmation that the polymer was a block copolymer.

Polymer BPS-4 was dissolved in N,N-dimethylacetamide in a concentration of 20 wt %, and the solution was cast on a glass plate and dried at 130° C. for 30 minutes and then at 210° C. for 30 minutes to obtain a 50 μm thick BPS-4 membrane. The membrane was immersed in a 1N NaOH aqueous solution for 2 hours and washed twice with ion-exchanged water. The membrane was further immersed in 1N HCl for 2 hours at room temperature and washed three times with ion-exchanged water. After confirming that the washing was neutral, the membrane was dried. The thus treated membrane had an ion exchange capacity of 1.43 mmol/g.

The proton conductivity of the BPS-4 membrane measured at 50° C. at a varied relative humidity is shown in Table 1. As shown in Table 1, the proton conductivity $C_{90}$ at 90% relative humidity and the proton conductivity $C_{40}$ at 40% relative humidity both at 50° C. had a relationship: $\log(C_{40})/\log(C_{90})=2.11$, which indicates excellent characteristics.

COMPARATIVE EXAMPLE 4

Polymerization for Block Polymer BP-5 (Aromatic Polyether Sulfone Block Copolymer):

Polymer f was prepared in the same manner as in Example 3. Separately, 89 g of polymer a synthesized in the same manner as in Example 1 was added to 350 ml of N,N- dimethylacetamide and 100 ml of toluene, and the mixture was heated up to 165° C. in a nitrogen stream while removing produced water together with toluene to prepare a polymer a solution. The polymer a solution was added to the polymer f solution, followed by stirring at 170° C. for 2 hours. The solution was poured into a large quantity of water to precipitate a white solid. The solid was collected by filtration and washed twice in hot water and once in methanol to give block polymer BP-5. The resulting polymer had a reduced viscosity $\eta_{sp/c}$ of 0.61.

Sulfonation of Block Polymer BP-5:

Ten grams of block polymer BP-5 was dissolved in 100 ml of 98% sulfuric acid, and the solution was stirred at 40° C. for 16 hours. The solution was poured into a large amount of water to precipitate a white solid, which was collected by filtration and washed twice in hot water and once in methanol to give polymer BPS-5.

The resulting polymer had an ion exchange capacity of 1.04 mmol/g (962 g/mol). H-NMR analysis revealed that the hydrophilic segment weight fraction W2 to hydrophobic segment weight fraction W1 ratio, W2/W1, was 0.57. The proportion of the hydrophobic segment in the whole block copolymer was 0.64.

TEM observation of a membrane obtained therefrom revealed a phase separation structure, which furnished the confirmation that the polymer was a block copolymer.

Polymer BPS-5 was dissolved in N,N-dimethylacetamide in a concentration of 20 wt %, and the solution was processed in the same manner as in Example 3 to obtain a 50 μm thick BPS-5 membrane. The membrane had an ion exchange capacity of 1.01 mmol/g.

The proton conductivity of the BPS-5 membrane measured at 50° C. at a varied relative humidity is shown in Table 1. As shown in Table 1, the proton conductivity $C_{90}$ at 90% relative humidity and the proton conductivity $C_{40}$ at 40% relative humidity both at 50° C. had a relationship: $\log(C_{40})/\log(C_{90})=2.45$, showing poor characteristics.

EXAMPLE 4

Fabrication of Fuel Cell:

A 5 wt % solution of polymer BPS-1 in N,N-dimethylacetamide was applied with a spatula on a 1 mg/cm² platinum-loaded gas diffusion electrode (available from ElectroChem, Inc., U.S.A.; area: 25 cm²), dried, and made to absorb water. The BPS-1 membrane obtained in Example 1 was sandwiched in between a pair of the resulting electrodes and hot pressed at 130° C. and 45 kg/cm² for 150 seconds to obtain a membrane electrode assembly. A membrane electrode assembly in a single cell EFC25-02SP supplied by ElectroChem, Inc., U.S.A., was replaced with the resulting assembly. The resulting single cell was subjected to power generation test by use of a fuel cell test system 890B-100/50 from Scribner Associates, U.S.A. and a fuel feeder 890-G1 from Toyo Corp. under conditions of 1.5 atm., a cell temperature of 60° C., a hydrogen and oxygen gas humidification temperature of 60° C., and a hydrogen and oxygen gas flow rate of 250 ml/min. The single cell EFC25-02SP of ElectroChem, Inc., U.S.A. was also tested under the same conditions. The results obtained are shown in FIG. 5.

TABLE 1

Proton Conductivity vs. RH Relationship (50° C.)

| Relative Humidity | Proton Conductivity (S cm⁻¹) | | | $\log(C_{40})/\log(C_{90})$ | W2/W1 |
|---|---|---|---|---|---|
| | 90% | 60% | 40% | | |
| Example 1 | $3.2 \times 10^{-2}$ | $5.3 \times 10^{-3}$ | $9.4 \times 10^{-4}$ | 2.03 | 0.98 |
| Comparative Example 1 | $2.0 \times 10^{-2}$ | $2.0 \times 10^{-3}$ | $1.5 \times 10^{-4}$ | 2.25 | (random) |
| Comparative Example 2 | $1.6 \times 10^{-2}$ | $2.9 \times 10^{-3}$ | $2.0 \times 10^{-5}$ | 2.62 | (blend) |
| Example 2 | $5.1 \times 10^{-2}$ | $8.6 \times 10^{-3}$ | $2.3 \times 10^{-3}$ | 2.04 | 0.75 |
| Comparative Example 3 | $8.2 \times 10^{-3}$ | $9.5 \times 10^{-5}$ | $5.7 \times 10^{-6}$ | 2.51 | 0.52 |
| Example 3 | $1.2 \times 10^{-2}$ | $8.0 \times 10^{-4}$ | $8.9 \times 10^{-5}$ | 2.11 | 0.95 |
| Comparative Example 4 | $9.0 \times 10^{-3}$ | $2.3 \times 10^{-4}$ | $9.8 \times 10^{-6}$ | 2.45 | 0.57 |

TABLE 2

Proton Conductivity vs. Temp. Relationship (90% RH)

| Temperature | Proton Conductivity (S cm⁻¹) | | | $\log(C_{150})/\log(C_{190})$ |
|---|---|---|---|---|
| | 50° C. | 70° C. | 90° C. | |
| Example 1 | $3.2 \times 10^{-2}$ | $4.3 \times 10^{-2}$ | $6.5 \times 10^{-2}$ | 1.26 |
| Comparative Example 1 | $2.0 \times 10^{-2}$ | $3.7 \times 10^{-2}$ | $6.1 \times 10^{-2}$ | 1.40 |

INDUSTRIAL APPLICABILITY

The polyelectrolyte according to the present invention and the polyelectrolyte membrane comprising the same are inexpensive and durable, and their proton conductivity is less susceptible to influences of humidity and temperature. They are therefore suited for use in fuel cells.

The invention claimed is:

1. A polyelectrolyte for a solid polymeric fuel cell, comprising:
   an aromatic polyether sulfone block copolymer comprising a hydrophilic segment containing sulfonic acid groups and a hydrophobic segment having no sulfonic acid groups, wherein,
   the hydrophilic segment weight fraction W2 to hydrophobic segment weight fraction W1 ratio falls in the range of 0.7<W2/W1<2.0, and the hydrophilic segment comprises a structural unit represented by chemical formula (2) into which sulfonic acid groups are introduced:

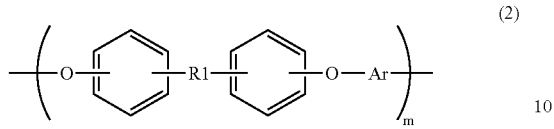

(2)

wherein R1 represents C(=O) or S(=O)$_2$, Ar represents a divalent aromatic residual group, m represents an integer of 3 to 1500, and the sulfonic acid groups are introduced to an aromatic ring selected from the group consisting of at least one of the aromatic rings bonded to R1, an aromatic ring of Ar and combinations thereof.

2. The polyelectrolyte for a solid polymeric fuel cell according to claim 1, wherein the hydrophilic segment containing sulfonic acid groups is water-soluble.

3. The polyelectrolyte for a solid polymeric fuel cell according to claim 1, wherein the hydrophobic segment comprises a structural unit represented by chemical formula (1)

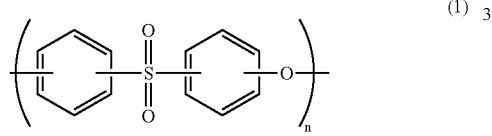

(1)

wherein n represents an integer of 3 to 1500.

4. The polyelectrolyte for a solid polymeric fuel cell according to claim 1, wherein, the divalent aromatic residual group Ar in chemical formula (2) is represented by chemical formula (3):

(3)

at least one sulfonic acid group is introduced into an aromatic ring in chemical formula (3), and R1 in chemical formula (2) is S(=O)$_2$ so that the hydrophilic segment is represented by chemical formula 7:

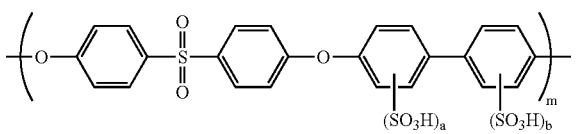

(7)

wherein a and b independently represent 0 or 1 provided both a and b do not represent 0.

5. The polyelectrolyte for a solid polymeric fuel cell according to claim 1, which is an aromatic polyether sulfone block copolymer, wherein, the hydrophobic segment comprises a block having a repeating unit represented by chemical formula (4):

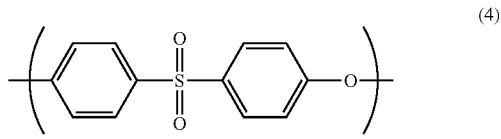

(4)

and the hydrophilic segment comprises a block having a repeating unit represented by chemical formula (7):

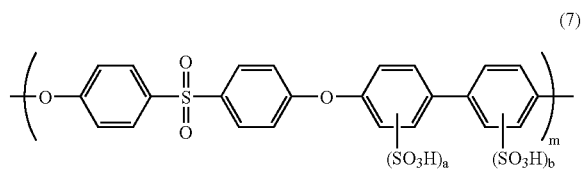

(7)

wherein a and b independently represent 0 or 1 provided that both a and b do not represent 0.

6. The polyelectrolyte for a solid polymeric fuel cell according to claim 1, which has an ion exchange capacity of 0.8 to 2.5 mmol/g.

7. A polyelectrolyte membrane for a solid polymeric fuel cell which is characterized by comprising the polyelectrolyte for a solid polymeric fuel cell according to claim 1.

8. The polyelectrolyte membrane for a solid polymeric fuel cell according to claim 7, which has a phase separation structure revealing domains when observed under a transmission electron microscope at 90,000 times magnification.

9. The polyelectrolyte membrane for a solid polymeric fuel cell according to claim 8, wherein a phase composed of a hydrophilic segment and a phase composed of a hydrophobic segment form a phase separation structure, and the observed phase separation structure is such that the average distance between gravity centers of adjacent domains or the average distance between lamellae is 5 to 900 nm.

10. The polyelectrolyte membrane for a solid polymeric fuel cell according to claim 7, which has a proton conductivity $C_{90}$ at 90% relative humidity and a proton conductivity $C_{40}$ at 40% relative humidity both at 50° C. satisfying the relationship: $\log(C_{40})/\log(C_{90}) \leq 2.2$.

11. The polyelectrolyte membrane for a solid polymeric fuel cell according to claim 7, which has a proton conductivity $C_{t50}$ at 50° C. and a proton conductivity $C_{t90}$ at 90° C. both at 90% relative humidity satisfying the relationship: $\log(C_{t50})/\log(C_{t90}) \leq 1.35$.

12. A solid polymeric fuel cell characterized by comprising the polyelectrolyte membrane according to claim 7.

13. A solid polymeric fuel cell characterized by comprising the polyelectrolyte for a solid polymeric fuel cell according to claim 1.

14. A polyelectrolyte for a solid polymeric fuel cell, comprising:

a sulfonated aromatic polyether sulfone block copolymer comprising a repeating hydrophilic segment containing sulfonic acid groups and a repeating hydrophobic segment not containing sulfonic acid groups, the hydrophilic segment weight fraction W2 to hydrophobic segment weight fraction W1 ratio falls in the range of 0.7<W2/W1<2.0, the hydrophilic segment comprises a sulfonated aromatic polyaryl ether sulfone represented by chemical formula (5):

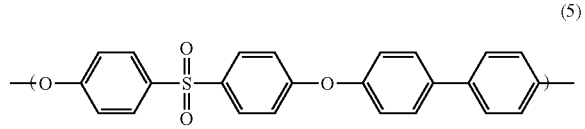
(5)

and the moiety of formula (5) represented by formula (6):

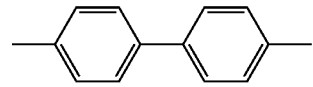
(6)

is sulfonated, and the hydrophobic segment comprises a non-sulfonated aromatic polyether sulfone represented by formula (4):

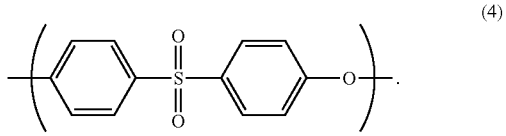
(4)

15. A polyelectrolyte for a solid polymeric fuel cell, comprising:

a block copolymer of a hydrophilic segment containing sulfonic acid groups and a hydrophobic segment not containing sulfonic acid groups, wherein, the hydrophilic segment weight fraction W2 to the hydrophobic segment weight fraction Wi ratio falls in the range of 0.7<W2/W1<2.0, the hydrophilic segment is represented by formula (2):

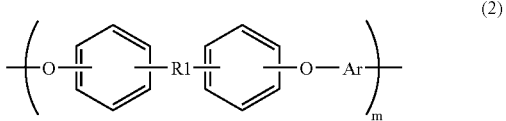
(2)

wherein R1 represents C(=O) or S(=O)$_2$, Ar represents a divalent aromatic residual group with aromatic rings, m represents an integer of 3 to 1500, and a sulfonic acid group is introduced to one of the aromatic rings bonded to R1.

* * * * *